United States Patent Office 2,768,842
Patented Oct. 30, 1956

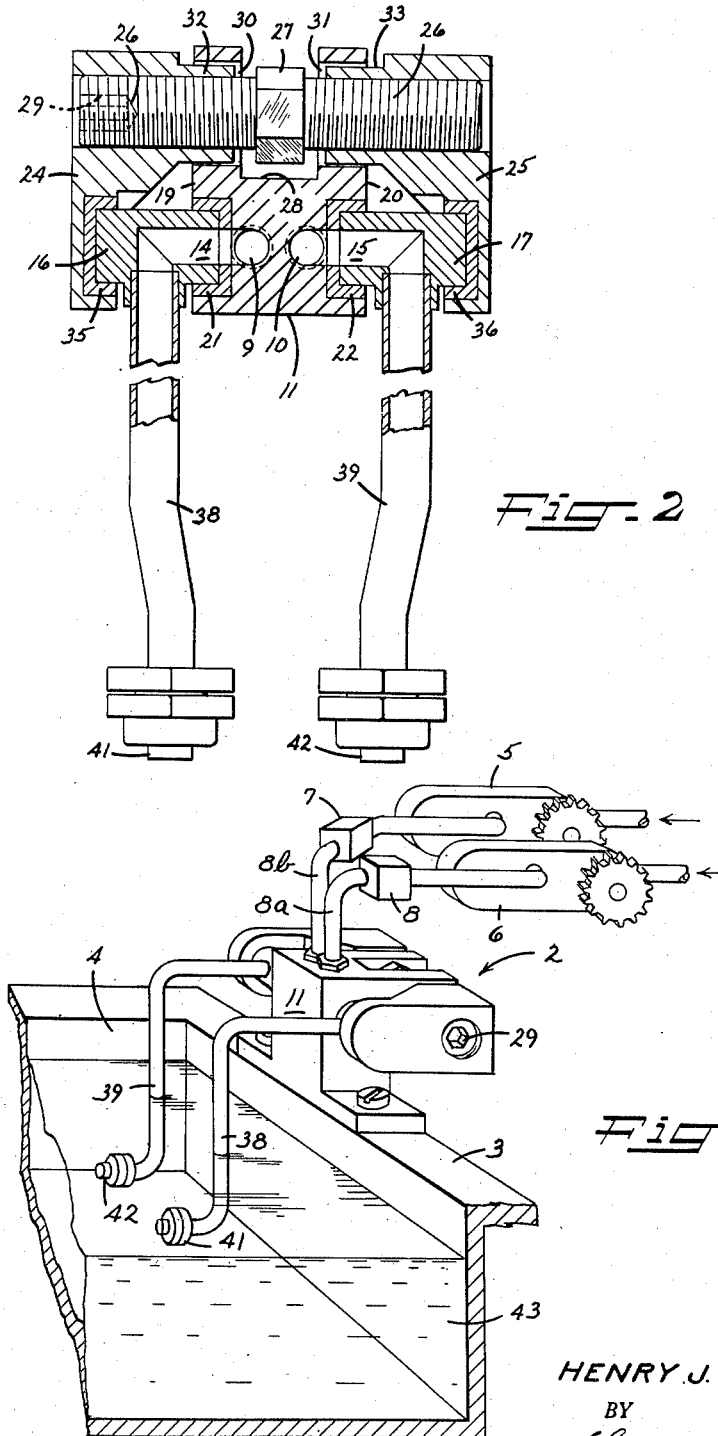

2,768,842

MULTIPLE SWIVEL FLUID TRANSMITTING DEVICE

Henry J. McDermott, Collingdale, Pa., assignor to American Viscose Corporation, Philadelphia, Pa., a corporation of Delaware Application December 13, 1952, Serial No. 325,864

7 Claims. (Cl. 285—136)

The present invention relates to plural-passageway fluid-conducting systems and particularly to a duplex type requiring a pivotable connection in each conduit thereof. The present invention arises primarily out of the necessity for conforming such fluid-conducting systems to the limited space afforded by existing equipment such as used in the manufacturing of rayon yarn.

It is an object of the invention to provide a compact fluid-conducting device having individual passageways for the transmission of fluids and a swivel connection in respective duct systems forming the passageways. It is also an object to provide such a device having its exterior contour free from nuts, bolt-heads, coupling portions, etc. It is another object to provide a device adapted to transmit two separate streams of viscose as a part of the duct systems therefor extending between the separate supply sources of separate spinnerets, such a device having separate swivel connections whereby a portion of the duct system handling one stream may be moved independently with respect to the analogous portions of the duct system for handling the other stream. Still another object is to provide a device in accordance with the foregoing object which is so compact as to be readily substituted within the existing spinning equipment for a device which conventionally handles a single stream of filament-forming liquid so that equipment previously used to handle one yarn may now be used to produce two concurrently running yarns. Other objects, features, and advantages will be apparent from the following description of the invention and the drawing relating thereto in which Fig. 1 is a fragmentary perspective view of artificial yarn-spinning equipment into which is incorporated apparatus in accordance with the invention; and Fig. 2 is a broken view in partial section taken along a horizontal plane of the apparatus shown in Fig. 1 when looking upwardly.

Briefly, the foregoing objects are accomplished by a double-swivel apparatus comprising a base or body member having one or more passageways terminating in two openings disposed within adjacent exterior bearing or seating surfaces of the body member facing therefrom in opposite directions, separate fluid-conducting elements in continuous and separate pivotable engagement with the surface surrounding each opening, and a clamp for engaging the elements and holding them against the bearing surfaces of the body member. The contour of the clamp, the body member, and the elements are interrelated to permit turning of each element on a fixed axis through an angle, e. g., 90° or 180°, while held between an adjacent surface of the clamp and the adjacent bearing surface. Each element has a passageway extending from the adjacent opening of the body member to an exterior surface member disposed laterally from the axis. An essential feature of the invention is the inter-related structure of the clamp and the body member whereby great compactness and elimination of the usual profusion of clamp parts is achieved. This result is obtained by employing a clamp which comprises separate members for engaging the rotatable elements, and means for drawing clamp members toward each other, such drawing means being disposed substantially and preferably entirely between the clamp members. In a preferred embodiment, the apparatus is made more stable by portions of the clamp members cooperating in loosely guiding relationship with portions of the body member.

A double-swivel apparatus, designated generally by the numeral 2, such as that generally described immediately above, is shown in Fig. 1 mounted on the top surface of the flanged edge 3 of the spinning bath container 4. The application of the invention as shown in this figure is typical of an installation adapted to spin two viscose yarns, each yarn comprising many filaments. The filament-forming liquid is supplied to the device 2 by separate pumps 5 and 6 which are connected through filters 7 and 8 (illustrated diagrammatically) to separate passageways 9 and 10 (Fig. 2) of a base member 11 by tubes 8a and 8b respectively. The passageways 9 and 10 of the base member 11 are L shaped and contiguous with the passageways 14 and 15 respectively extending within the pivotable elements 16 and 17. The body member 11 is recessed along oppositely-facing wall surfaces 19 and 20 to provide cylindrical depressions for receiving a pair of bushings 21 and 22. These bushings are cup-shaped and have interior surfaces complementary to the end portions of the elements 16 and 17 which are normally disposed therewithin. The bushings are fabricated from a corrosion-resistant and wear-resistant material such as one comprising polytetrafluoroethylene (a preferred material) or one of the other waxy-feeling synthetic organic resins, e. g., polymers of ethylene and chlorotrifluoroethylene.

The elements are held in position in engagement with the bushings 21 and 22 by a clamp which comprises jaw-like members or lugs 24 and 25 in threaded relationship with a screw 26 having a right-hand threaded section extending into the lug 24 and a left-hand threaded section extending into the lug 25. The screw has a nut or polygonal portion 27 disposed within a recess 28 of the body portion 11 which provides access to the section 27 with a wrench. If desired, the section 27 may be shaped in some other manner and a polygonal recess 29 provided in one or both end portions of the screw 26 for insertion of a wrench having a complementary portion.

The body portion has coaxial bores 30 and 31 into which extend the cylindrical projections 32 and 33 respectively of the lugs 24 and 25 with respect to the body member 11 whereby the lugs may move toward and away from each other in a direction parallel to the axis of the screw 26 when the latter is turned. The bores 30 and 31 are large enough to provide radial clearance for the cylindrical portions of the lugs so as to prevent any binding therein resulting from deflection of the screw 26 in drawing the lugs tightly. The lugs are cylindrically recessed to receive bushings 35 and 36 which fit neatly over the unapertured end portions of the elements 16 and 17. The bushings 35 and 36 may be fabricated from the same material as that used in making the bushings 21 and 22. The bushings 21, 22, 35, and 36 are normally pressed into the recesses of the lugs 24 and 25 and the base member 11 are, for purposes of defining the invention, considered as portions thereof. However, each bushing may be forced onto the protruding portions of the elements 16 and 17 which extend into the recesses and, if preferred, considered as portions of such elements.

The elements 16 and 17 are counterbored along the portions of the passageways 14 and 15 extending laterally from the pivotable axes to receive tubes 38 and 39 respectively. These tubes may be of any shape or length for positioning the spinnerets 41 and 42 at a desired depth or immersion within the spinning bath 43. As shown in their normal operating positions, the tubes 38 and 39 extend horizontally from the elements 16 and 17 and then perpendicularly into the bath. Their range of swinging relative to the device 2 is approximately 90 degrees although the parts of the device, particularly members 24 and 25, may be contoured or modified to obtain a greater swinging range of the tubes. The device 2 may be also re-oriented to obtain a greater swinging range such as by mounting it in a position wherein it is turned 90° clockwise with respect to its position on the flange 3 as shown. The tubes 38 and 39 are secured within respective elements 16 and 17 by any convenient method such as by soldering, press-fitting, or by threading parts whereby the tubes may be screwed into the elements.

In fulfilling the main objective of the invention, i. e., to provide a compact space-saving mounting having independently pivotal portions in two separate conduit systems, it will be noted that the screw 26 is completely disposed within and between the lugs 24 and 25, thus avoiding space-consuming projections which extend substantially beyond the general contour of the base or body member as would be derived, for example, by an adaptation of the devices heretofore available. It is to be noted also that the screw 26 is disposed approximately within a space bounded by the planes of outer oppositely-facing surfaces of the members or lugs 24 and 25. It is conceivable that end portions of the screw 26 may extend beyond the threaded bores therefor in the members 24 and 25, but substantial extension therefrom is preferably avoided. It is an objective, as borne out by the embodiment illustrated, to employ an instrumentality for drawing the pressure members together which is disposed completely, if possible, within the general contour of the device 2 as developed by the exterior surfaces of the lugs and the body members.

While the invention includes a species thereof in which the filament-forming liquid is supplied to the fittings 16 and 17 of the device 2 by a branched passageway within the body member 11 having a single inlet duct and a single supply connected therewith, the preferred embodiment, as employed in the spinning of yarns, is shown wherein a separate supply is connected with each spinneret by an independent conduit system extending through the device 2. This is preferred since in practice it is found that each spinneret should have its own supply pump, or other positive displacement system, for feeding filament-forming liquid thereto at a constant rate in order that yarns of uniformly equal or predetermined denier may be produced from both spinnerets supplied by the device 2.

While a preferred embodiment of the invention has been shown and described, it is to be understood that changes and variations may be made without departing from the spirit and scope of the invention as defined in the appended claims.

I claim:

1. Double-swivel fluid-conducting apparatus comprising a body member having an internal duct means terminating in at least three separate openings into the member, the member having a pair of circular seating surfaces facing outward generally opposite directions in concentric relation to axes which are approximately perpendicular to the same plane, each seating surface having one of said openings disposed centrally therein; separate independently pivotable fluid-conducting elements, each element having circular coaxial surfaces at each end and an elbow-shaped passageway extending to a lateral surface of the element centrally from, and terminating as an opening in, one of the end surfaces, the other end of each element being closed in its normal position within the apparatus, the end surface of each element which has one of said openings being adapted to engage in sealed pivotal concentric seating relationship one of said seating surfaces to thus place the passageway of the respective element in communication with the duct means of the member; and clamping means for holding the elements in positions of said seating relationship comprising a pair of lugs, and means for drawing the lugs toward each other secured to, and extending between, the lugs, and the drawing means being disposed entirely within a space between planes of outer oppositely-facing surfaces of the lugs, the lugs having inwardly-facing opposing surfaces for engaging said end surfaces at the closed ends of the elements, said drawing means being disposed wholly exteriorly of the passageway and the interior duct means.

2. Double-swivel fluid-conducting apparatus comprising a body member having two separate internal ducts, each duct terminating in two openings in the outer surface of the member, the member having a pair of circular seating surfaces facing in outward generally opposite directions in concentric relation to axes which are approximately perpendicular to the same plane, each seating surface having an opening of one of the two ducts disposed centrally in said surface; separate independently pivotable fluid-conducting elements, each element having circular coaxial surfaces at each end and an elbow-shaped passageway extending to a lateral surface of the element centrally from, and terminating as an opening in, one of the end surfaces, the other end of each element being closed in its normal position within the apparatus, the end surface of each element which has one of said openings being adapted to engage in sealed pivotable concentric seating relationship one of said seating surfaces to thus place the passageway of the respective element in communication with the ducts of the member; and clamping means for holding the elements in positions of said seating relationship comprising a pair of lugs, and means for drawing the lugs toward each other secured to, and extending between, the lugs, and the drawing means being disposed approximately entirely within a space between planes of outer oppositely-facing surfaces of the lugs, the lugs having inwardly-facing opposing surfaces for engaging said end surfaces at the closed ends of the elements, said drawing means being disposed wholly exteriorly of the passageway and the ducts.

3. Double-swivel fluid-conducting apparatus comprising a body member having two separate internal ducts, each duct terminating in two openings in the outer surface of the member, the member having a pair of circular seating surfaces facing in outward generally opposite directions in concentric relation to an axis extending through the member, each seating surface having an opening of one of the two ducts that is disposed centrally in said surface; separate independently pivotable fluid-conducting elements, each element having circular coaxial surfaces at each end and an elbow-shaped passageway extending to a lateral surface of the element centrally from, and terminating as an opening in, one of the end surfaces, the other end of the element being closed in its normal position within the apparatus, the end surface of each element which has one of said openings being adapted to engage in sealed pivotable concentric seating relation one of said seating surfaces to thus place the passageway of the respective element in communication with the ducts of the member; and clamping means for holding the elements in positions of said seating relation comprising a pair of lugs, and means secured thereto for drawing the lugs toward each other, and extending between, the lugs, the drawing means being disposed approximately entirely within a space between the planes of the outer oppositely-facing surfaces of the lugs, the lugs having inwardly-facing opposing surfaces for engaging said end surfaces at the closed ends of the elements, said drawing means being disposed wholly exteriorly of the passageway and the duct.

4. Double-swivel fluid-conducting apparatus as defined in claim 3 wherein the drawing means is a screw member having a right-hand threaded portion in threaded relation with one element and a left-hand threaded portion in threaded relation with the other element.

5. Double-swivel fluid-conducting apparatus as defined in claim 3 wherein the drawing means comprises a screw member having a right-hand threaded portion in threaded relation with one element and a left-hand threaded portion in threaded relation with the other element, said body member having portions surrounding the screw member in loosely fitting relation with the clamping means for holding the clamping means in a desired relation with said elements and the member.

6. Double-swivel fluid-conducting apparatus as defined in claim 5 wherein said portions surrounding the screw member have a passageway for housing the screw member, said elements having portions extending into the passageway in slidable relation with the periphery of the passageway.

7. Double-swivel fluid-conducting apparatus as defined in claim 6 wherein the body member has a recess extending inwardly from an outer surface thereof transversely of the passageway approximately midway along its length for access to a section of the screw member.

References Cited in the file of this patent

UNITED STATES PATENTS

| | | |
|---|---|---|
| 105,268 | Smith | July 1, 1870 |
| 918,542 | Hart | Apr. 20, 1909 |
| 976,270 | Leonard | Nov. 22, 1910 |
| 1,323,320 | Sanne-Jacobsen | Dec. 2, 1919 |
| 1,347,660 | Reiband | July 27, 1920 |
| 1,870,036 | Bruce | Aug. 2, 1932 |
| 1,920,658 | Murphy | Aug. 1, 1933 |